US008345420B2

(12) United States Patent
McClure et al.

(10) Patent No.: US 8,345,420 B2
(45) Date of Patent: Jan. 1, 2013

(54) BATTERY ASSEMBLY FOR BATTERY POWERED PORTABLE DEVICES

(75) Inventors: Stephen R. McClure, San Francisco, CA (US); Scott J. Hagadone, Tracy, CA (US); Sheba Devan, Santa Clara, CA (US); Val Valentine, Castro Valley, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 12/894,531

(22) Filed: Sep. 30, 2010

(65) Prior Publication Data
US 2011/0304984 A1    Dec. 15, 2011

Related U.S. Application Data

(60) Provisional application No. 61/354,600, filed on Jun. 14, 2010.

(51) Int. Cl.
*G06F 1/16*    (2006.01)
(52) U.S. Cl. .................. 361/679.56; 429/223; 29/623.1; 320/139
(58) Field of Classification Search ................ 429/7, 97, 429/161, 137, 223, 186, 179; 29/623.3, 730, 29/623.1, 592.1; 428/35.2; 361/87, 235, 361/600, 734, 752, 679.01, 679.02, 679.26, 361/679.32, 679.55, 679.56, 301.4; 320/118, 320/162, 107, 134, 104, 139; 248/309.1; 345/87, 212
See application file for complete search history.

(56) References Cited

U.S. PATENT DOCUMENTS

| | | |
|---|---|---|
| 6,001,139 A | 12/1999 | Asanuma et al. |
| 2002/0094475 A1 | 7/2002 | Aoyama |
| 2002/0114993 A1 | 8/2002 | Miyaki et al. |
| 2002/0164441 A1 | 11/2002 | Amine et al. |
| 2003/0146734 A1 | 8/2003 | Kozu et al. |
| 2005/0130035 A1 | 6/2005 | Inada et al. |
| 2006/0166086 A1 | 7/2006 | Kato |
| 2007/0231682 A1 | 10/2007 | Aoyama et al. |
| 2008/0081249 A1 | 4/2008 | Kaneko |
| 2009/0191450 A1 * | 7/2009 | Kim ............................ 429/97 |
| 2011/0070466 A1 * | 3/2011 | Park et al. ..................... 429/7 |
| 2011/0281141 A1 * | 11/2011 | Baek et al. .................... 429/7 |
| 2012/0121942 A1 * | 5/2012 | Kim ............................ 429/7 |

OTHER PUBLICATIONS

International Search Report dated Jan. 4, 2012 of International Application No. PCT/US2011/036847.
Written Opinion of the International Searching Authority dated Jan. 4, 2012 of International Application No. PCT/US2011/036847.
Walter Galan: "Installing iPad Wi-Fi Battery Replacement", Internet, retrieved on Dec. 21, 2011.
Ben Eisenman: "Installing iPhone 3GS Battery", Internet, retrieved on Dec. 21, 2011.
Combined Search and Examination Report under Sections 17 and 18(3) dated Sep. 14, 2011 in Great Britain Patent Application No. GB 1108331.8.

\* cited by examiner

*Primary Examiner* — Hung Duong
(74) *Attorney, Agent, or Firm* — Dorsey & Whitney LLP

(57)    ABSTRACT

A battery assembly includes at least a plurality of battery cells that includes at least a first and a second battery cell each attached to a distributed battery monitoring unit, the second battery cell being associated with an external circuit, the second battery cell connected to a battery management unit (BMU) by way of a pre-formed battery contact shaped to accommodate the external circuit. The plurality of battery cells are electrically connected to at least the BMU such that each of the plurality of battery cells are substantially aligned with each other thereby preserving a battery profile corresponding to unconnected battery cells.

23 Claims, 10 Drawing Sheets

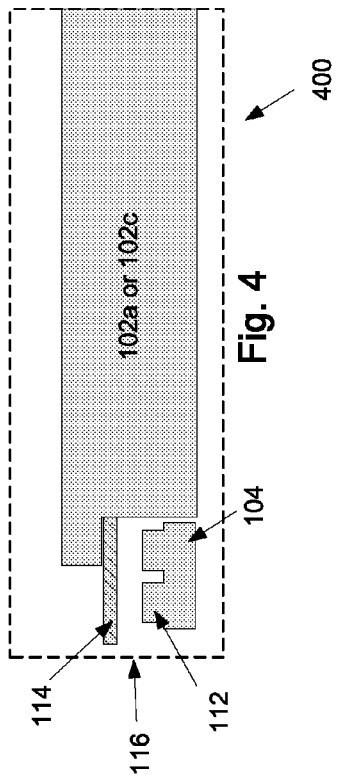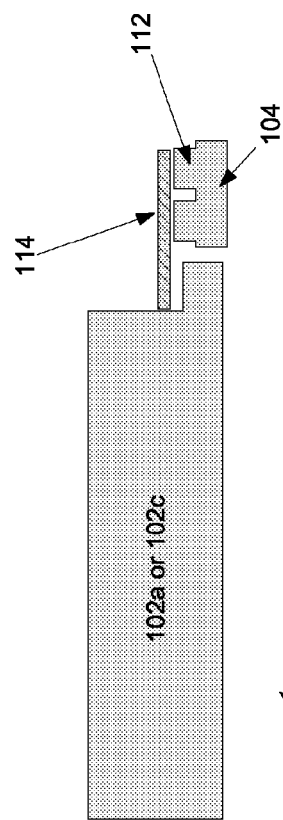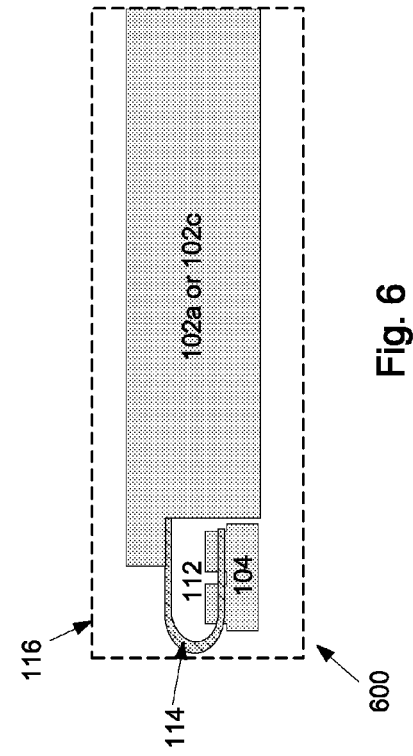

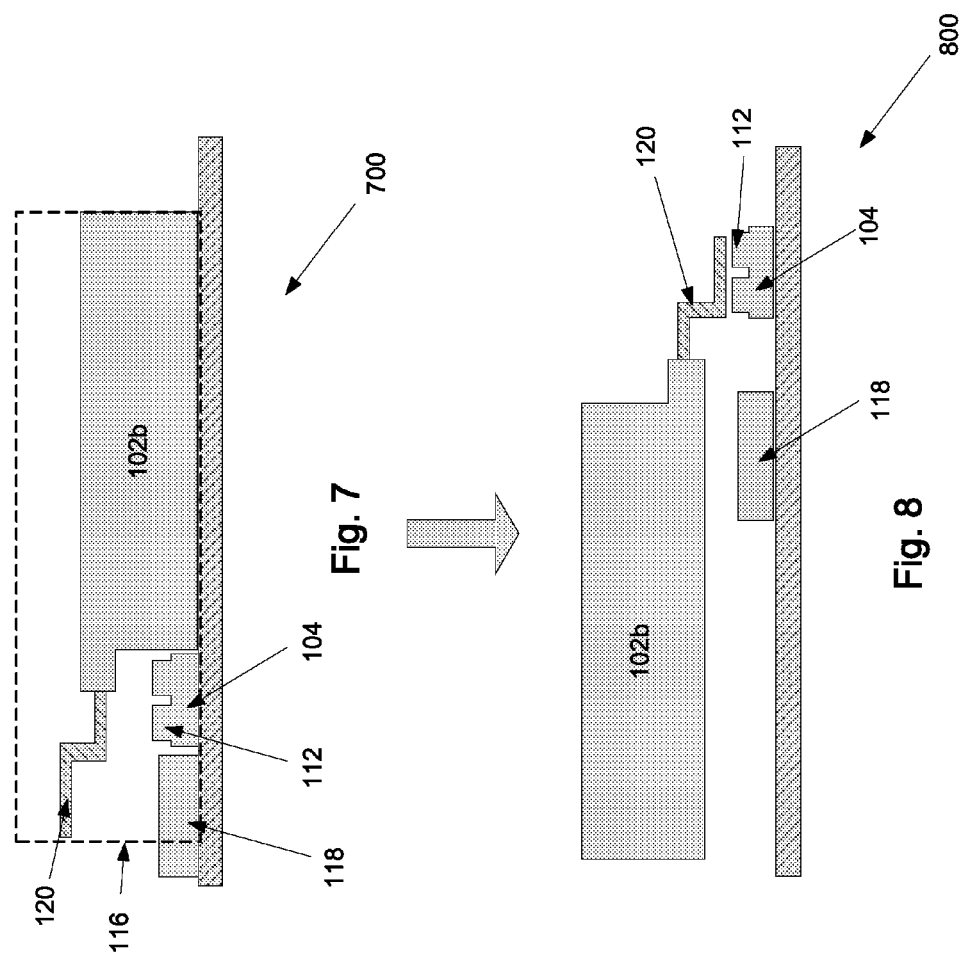

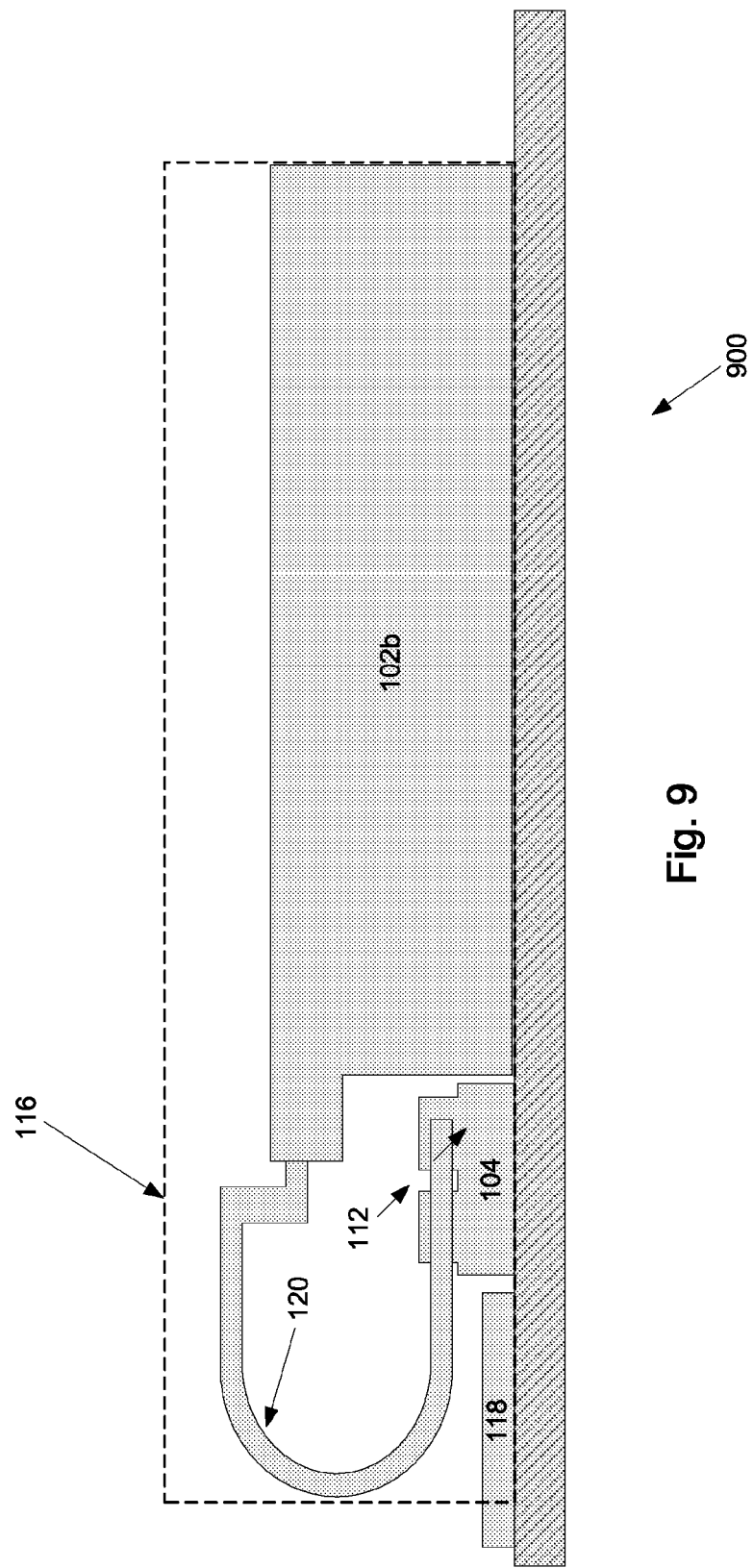

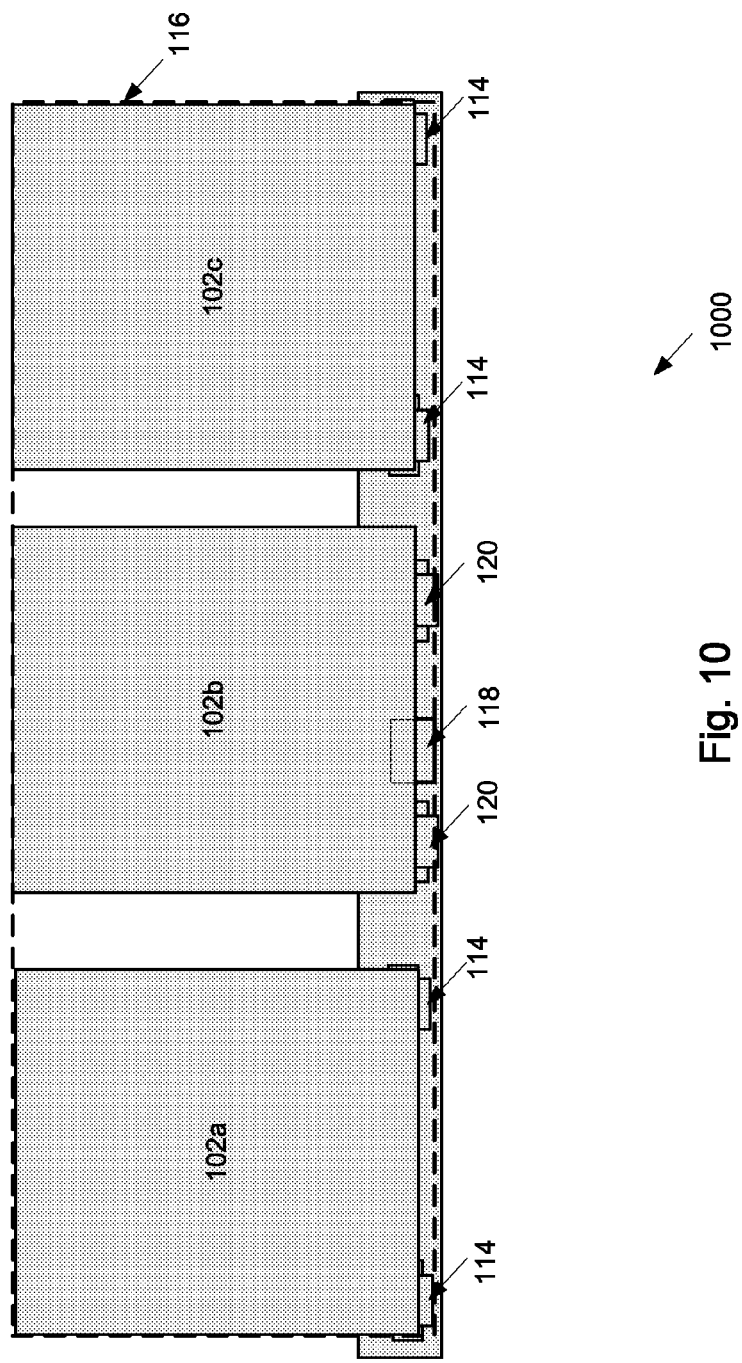

BATTERY ASSEMBLY FOR BATTERY POWERED PORTABLE DEVICES

CROSS REFERENCE TO RELATED APPLICATIONS

This patent application takes priority under 35 U.S.C. 119 (e) of U.S. Provisional Patent Application entitled "BATTERY ASSEMBLY FOR TABLET LIKE DEVICES" by McClure et al. filed Jun. 14, 2010 that is incorporated by reference in its entirety for all purposes.

FIELD OF THE DESCRIBED EMBODIMENTS

The described embodiments relate generally to batteries for portable computing devices. More particularly, the present embodiments relate to conformally shaped battery packaging designs suitable for tablet devices.

DESCRIPTION OF THE RELATED ART

A design of a portable computing device can involve complex tradeoffs. A few factors that can be considered in the design process are cosmetic appeal, weight, manufacturability, durability, thermal compatibility and power consumption. A component that is selected on the basis of its positive contribution to one of these design factors can have an adverse impact on one of more other design factors.

A portable power source, typically, a battery of some type is an important component in the design of a portable computing device. The portable power source provides operating power for the portable computing device when it is not near a fixed power source, such as a wall outlet. Factors in selecting a portable power source can be energy density, form factor and durability.

Energy density can refer to the amount of energy per given volume or per given mass that the portable power source is capable of delivering to the portable computing device. The form factor can refer to the shape of the package containing the portable power source. For instance, portable computing devices that are slim require an overall form factor for the portable power source that is also slim. The durability can relate to containment of any damaging elements associated with a battery cell. For example, portable power sources often include liquid or gel type electrolytes that need to be contained to prevent damage to other electronic components where the packaging needs to be durable enough to contain these damaging elements under normal operational conditions.

The energy density for a portable power device, such as a battery, can be affected by the type battery cell that is employed and its associated packaging. The packaging design can affect the energy density in a number of ways. First, the energy density per mass will decrease as the mass of the packaging increases. The packaging decreases the energy density per mass because it adds mass to the system without providing additional energy. The mass of the packaging design can be constrained by durability considerations.

Second, the energy density per volume is affected by packing efficiency where the packing efficiency can be constrained by a desired form factor for the packaging design. An inefficiently packaged battery cell can have a lower energy density per volume than an efficiently packaged battery cell. As the energy density per volume decreases, the volume taken up by the portable power device increases, which can be undesirable for utilization with a portable computing device.

In a portable computing device, it is generally desirable to minimize the weight and volume of each component while still maintaining desired functionality and performance levels. Therefore, it would be beneficial to provide a housing assembly for a battery useable in at least a portable computing device that is durable, lightweight and efficiently packaged. It would also be beneficial to provide methods for assembling the battery that meet the above conditions and perform satisfactorily during operational cycling of the device.

SUMMARY OF THE DESCRIBED EMBODIMENTS

This paper describes various embodiments that relate to systems, methods, and apparatus for enclosures for use in portable computing applications and more particularly for use in tablet like devices.

A method can be performed by receiving a plurality of battery cells in a shipping configuration, each of the plurality of battery cells being electrically unconnected, processing the shipping configuration to form a pre-assembly configuration of the plurality of battery cells, electrically connecting at least a first one of the plurality of battery cells to a corresponding distributed battery management unit (BMU), pre-forming a battery contact associated with a second battery cell, the second battery cell associated with an external circuit package, the preformed battery tab having a shape in accordance with the external circuit package, moving the second battery cell such that the pre-formed battery tab is in proximity to a BMU contact, electrically connecting the pre-formed battery tab to the BMU contact, returning the second battery cell to the original orientation, and providing a battery assembly suitable for a small form factor computing device.

A battery assembly includes at least a plurality of battery cells each of which includes at least an electrode assembly including an anode and a cathode, and an electrolyte, and a containment structure for enclosing the electrode and the electrolyte, the containment structure configured to prevent leakage of the electrolyte or gasses generated during operation of the battery assembly. The plurality of battery cells includes at least a first and a second battery cell each attached to a distributed battery monitoring unit, the second battery cell being associated with an external circuit, the second battery cell connected to a battery management unit (BMU) by way of a pre-formed battery contact shaped to accommodate the external circuit. The plurality of battery cells are electrically connected to at least the BMU such that each of the plurality of battery cells are substantially aligned with each other thereby preserving a battery profile corresponding to unconnected battery cells.

A small form factor computing device includes at least a battery assembly attached to an interior portion of a housing. The battery assembly, in turn, includes a plurality of battery cells, and a distributed battery management unit (dBMU). In the described embodiment the plurality of battery cells includes at least a first and a second battery cell each connected to the distributed battery monitoring unit (dBMU) and in proximity with an external circuit connected to the dBMU. The second battery cell is connected to the distributed battery management unit (dBMU) by way of a pre-formed battery contact shaped to accommodate the external circuit. The plurality of battery cells are electrically connected to at least the dBMU such that each of the plurality of battery cells are substantially aligned with each other thereby preserving a battery profile corresponding the unconnected battery cells the battery assembly is attached directly to an interior portion of the housing.

In one aspect, the small form factor computing device is a tablet computer.

A method of assembling a tablet computing device can be performed by receiving a tablet computing device housing receiving a plurality of batteries and a distributed battery management unit (dBMU) from a battery vendor in a shipping configuration sized to fit within a shipping configuration profile, processing the plurality of unconnected plurality of batteries to form a battery assembly, the battery assembly comprising a plurality of connected batteries each being connected to the dBMU, the battery assembly having a size that fits within the shipping configuration profile, and using an adhesive to attach a battery assembly directly to an interior portion of the housing. In the described embodiment, the battery assembly includes a plurality of battery cells, and a distributed battery management unit (dBMU). A plurality of operational components are electrically connected to the battery assembly prior to sealing the housing.

In a particular embodiment, the plurality of battery cells includes at least a first and a second battery cell each connected to the distributed battery monitoring unit (dBMU), the second battery cell being associated with an external circuit connected to the dBMU, the second battery cell connected to the distributed battery management unit (dBMU) by way of a pre-formed battery contact shaped to accommodate the external circuit, and wherein the plurality of battery cells are electrically connected to at least the dBMU such that each of the plurality of battery cells are substantially aligned with each other thereby preserving a battery profile corresponding the unconnected battery cells, wherein the battery assembly is attached directly to an interior portion of the housing; and Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 4-6 illustrate a particular manner of electrically connecting a first battery cell to BMU in accordance with the described embodiments.

FIGS. 7-9 illustrate a particular manner of electrically connecting a second battery cell associated with an external circuit to BMU in accordance with the described embodiments.

FIG. 10 shows completed battery assembly that conforms to the battery profile of the shipping configuration in accordance with the described embodiments.

DETAILED DESCRIPTION OF SELECTED EMBODIMENTS

Figure 1:
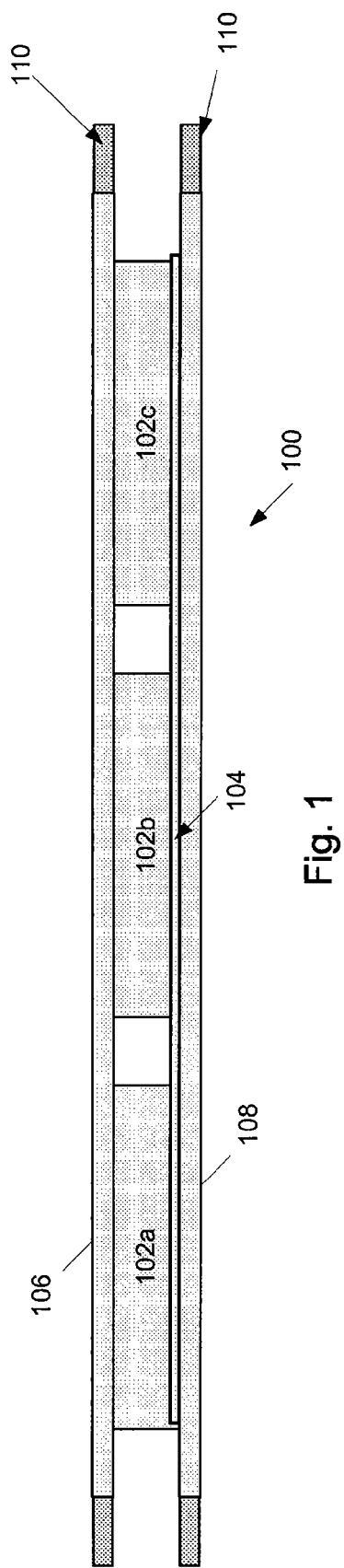
FIG. 1 shows a plurality of battery cells arranged in a shipping configuration in accordance with the described embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following relates to power supply assemblies formed of a plurality of individual battery cells each adhesively attached to a portion of a housing, the housing used to enclose operational components of a portable computing device in the form of a tablet like device such as an iPad™ manufactured by Apple Inc. of Cupertino Calif. In the described embodiments, the housing can be used to enclose and support the operational components and include a front portion and a rear portion. The front portion being suitable for providing support for a display element, such as a display screen. The rear portion of the housing can be used as the structure onto which the plurality of battery cells can be attached. The individual battery cells can be each directly attached to the rear portion of the housing an adhesive, such as, for example, VHB™ type adhesive. A VHB™ double-sided bonding tape is commercially available from 3M Company of St. Paul, Minn. After the battery cells have been attached, the rear portion and the front portions can be brought together and physically secured to each other using any suitable attachment mechanism.

By directly attaching each of the battery cells directly to the housing, the need for a separate battery support/protection structure (such as a battery case) that is typically used in a conventional battery pack is not needed. The conventional battery packs are typically plastic enclosures that surround the battery cells that are separate from the computer or device housing. Therefore, by eliminating the battery pack, the overall weight and z stack height of the power supply assembly and ultimately the tablet like device can be reduced over that required when a conventional battery pack is used.

Another advantage of the power supply assembly is that since the battery cells are directly attached to the rear portion of the housing, there is no need for pre-assembly of the battery cells as would be required with the use of the conventional battery pack. By obviating the need for pre-assembly, there is no need for a separate battery pack vendor because an inventory of battery cells is all that is required to assemble the power supply. Moreover, any repair and replace operations can be easily carried out using pull tabs or removal handles that can be placed on a portion of the battery cells. Such tabs would facilitate removal of a battery cell that needs to be repaired or replaced. For example, a pull tab can be placed on a side of the battery cell; the pull tab can then be used to easily remove the defective battery cell by simply pulling on the tab. The power supply assembly can be suitable for a portable computing device, such as, but not limited to a laptop computer, net-book computer, tablet computer, smart phone, a portable media player, etc.

FIG. 1 shows a side view shipping configuration 100 suitable for shipping a number of battery cells in accordance with the described embodiments. A battery vendor can produce individual (i.e., unconnected) battery cells and assemble any number of individual battery cells in shipping configuration 100 for shipment to an end user. Shipping configuration 100 can include a number of individual battery cells. The individual battery cells can be of different types, sizes, and numbers, and can be distributed in different configurations. Therefore, for the remainder of this discussion and without loss of generality, the individual battery cells included in shipping configuration 100 will be described in terms of jelly roll type battery cells.

Shipping configuration 100 can include a plurality of battery cells 102a, 102b, and 102c and at least one distributed battery monitoring unit (BMU) 104. In order to effectuate reduced cost and time to assembly, shipping configuration 100 can be received at an assembly operation at the end user's location directly from the battery vendor thereby reducing overall costs and time required for manufacturing. Within shipping configuration 100, each of the plurality of battery cells 102 and distributed battery monitoring unit (dBMU) 104 can be enclosed between and adhesively attached to first protective sheet 106 and second protective sheet 108 (sometimes referred to as release liners) formed of, for example, Mylar. dBMU 104 can include a temperature cut off (TCO) mechanism or thermal fuse that can be used to prevent battery 102 from overheating. Release liners 106 and 108 can provide support and protection for battery assembly 100 during the shipping process as well as during preliminary assembly operations. For example, release liners 106 and 108 provide support, protection, and help to fixture battery assembly 100 during a pre-installation procedure described in more detail below.

Battery cell 102 can include a sheet with a number of layers, such as a layer of cathode material, a layer of anode material and a separator material between the anode and cathode layer. The sheet can be rolled or folded up to form battery cell 102. The cathode material can include lithium along with a suitable cathode material, such as porous carbon can be used to form a lithium ion type battery. In other embodiments, battery cell 102 can be a stacked cell. In a particular embodiment, a liquid or gel electrolyte can be used for battery cell 102. A lithium ion battery is an example of a battery system using a liquid or gel electrolyte. In another embodiment, a dry electrolyte, such as a polymer electrolyte can be used with battery cell 102. A dry lithium polymer battery is one example of a battery system employing a dry electrolyte. In particular embodiments, a gel or liquid electrolyte can be used in combination with a dry electrolyte, such as the polymer electrolyte. For instance, a lithium ion polymer battery uses a polymer electrolyte in combination with a liquid or gel electrolyte. The liquid or gel electrolyte can be added to improve the conductivity of the battery system at lower temperatures, such as at room temperature conditions or colder.

In some embodiments, battery cell distribution can be adjusted. For example, battery cells 102 can have different voltages or different types of cells can be used in the device. For example, in some embodiments, the tablet computing device can include multiple power sources and the power conditioning circuitry can be configured to adjust output voltages based upon the charge states of one or more of the power sources.

Battery cells 102 can be the same or different sizes or even different types of batteries. Battery cells 102 can also be positioned in different locations and separate from one another, but can also be coupled to one another. When coupled together, battery cells 102 can use power conditioning circuitry, which is capable of adjusting the voltage of each battery cell 102 depending on its current charge level, how it is coupled to other battery cells, charge levels of other battery cells, and the requirements of associated device components. It will be understood that battery cells 102 may have different sizes and shapes and may be distributed in the housing to take advantage of available space in order to minimize the overall size of the device.

According to the embodiments described herein, battery cells 102 are each directly adhered to the housing of the device without a separate battery pack or enclosure. As battery cells 102 are not enclosed in a separate pack, they are therefore easily accessible. Thus, the lack of a separate pack makes it easier to identify and repair or replace a faulty battery cell. A removal mechanism, such as a pull tab or a removal handle, can be attached to battery cell 102 to facilitate removal of a battery cell 102 that needs to be repaired or replaced.

Figure 2:
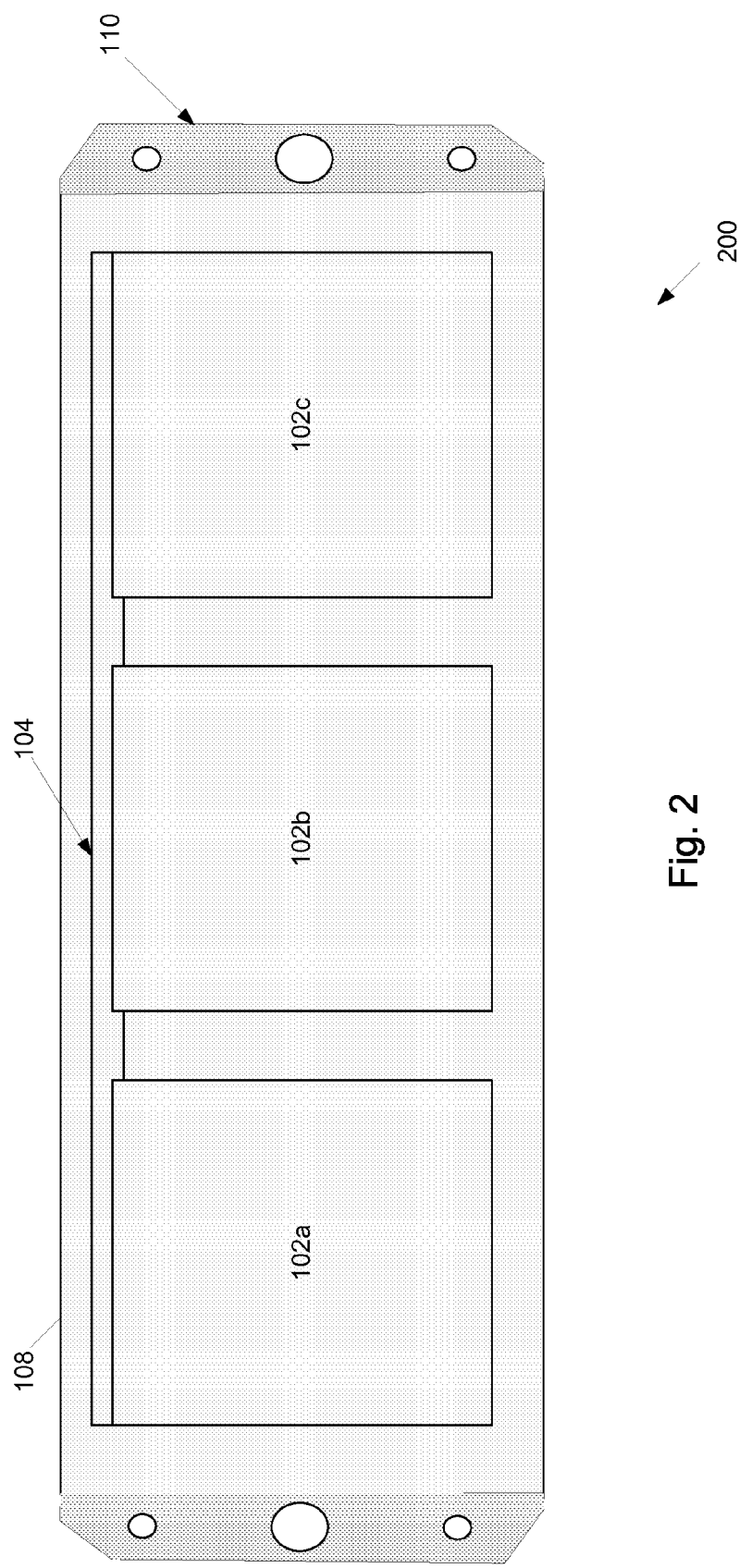
FIG. 2 shows the plurality of battery cells show in FIG. 1 in a pre-assembly configuration.

In preparation for an assembly process that includes attaching appropriately configured battery cells 102 to an interior of a computing system along the lines of an iPad™ tablet computing system manufactured by Apple Inc. of Cupertino, Calif. In order to prepare battery cells 102 for installation and attachment, at least one of the release liners 106, 108 must be removed from shipping configuration 100. Typically, the release liner to be removed is simply grasped at one or the other of release tabs 110 and peeled off in a single motion. FIG. 2 shows pre-assembly configuration 200 presuming that release liner 106 has been removed exposing plurality of battery cells 102a, 102b, and 102c referred to hereinafter as first battery cell 102a, second (or center) battery cell 102b, third battery cell 102c and dBMU 104 all adhesively attached to release liner 108.

One of the goals of the described embodiments is to electrically connect each battery cell 102 to dBMU 104 and still maintain an original battery cell profile. In other words, an amount of space taken up by battery cells 102a, 102b, and 102c can be essentially the same post assembly as pre-assembly. In this way, space within the tablet computing system dedicated for the portable power supply represented by an assembly configuration of battery cells 102 can be limited to that space required for the battery cells themselves and little more leaving additional space for other components. In order to accomplish this goal, battery cells 102 can be connected together to form an assembled configuration a manner described below and shown in the accompanying figures.

Figure 3:
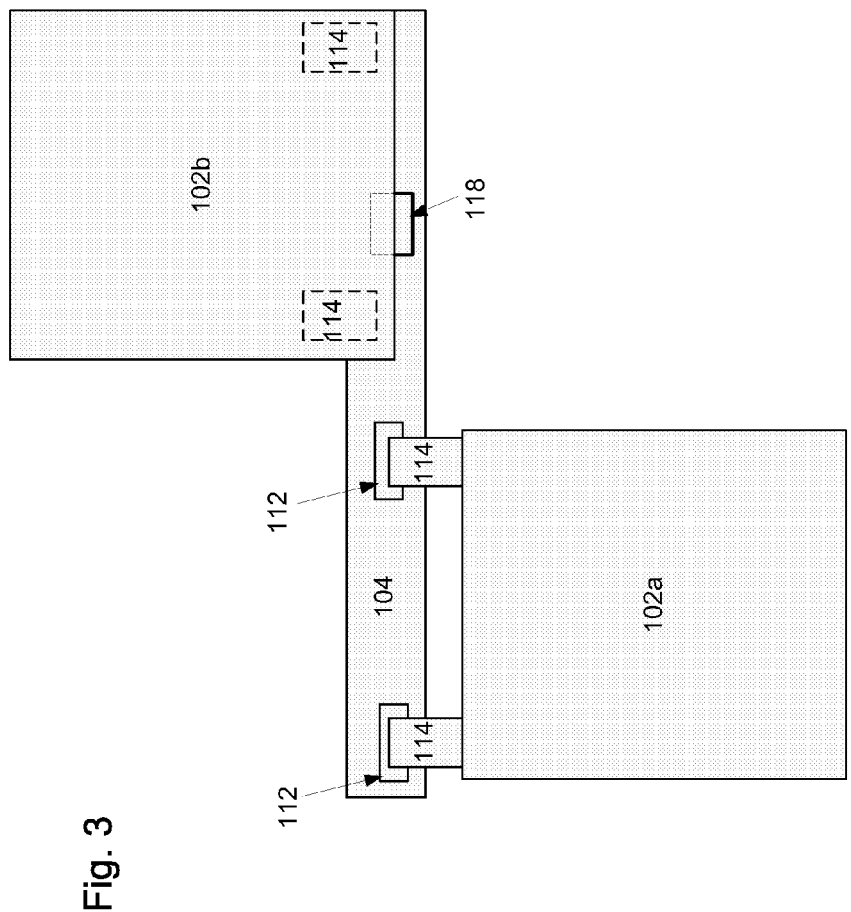
FIG. 3 shows relative orientation of a first and a second battery cell while the first battery cell is being electrically connected to a battery management unit (BMU).

In one embodiment, first battery cell 102a can be attached to BMU contact 112 by first moving first battery cell 102a. In one embodiment the moving can take the form of flipping first battery cell 102a over as shown in FIG. 3 to expose contacts 112 on dBMU 104 and electrical tabs 114 on battery cell 102a. It should be noted that substantially the same procedure can be followed for third battery cell 102c as that described for first battery cell 102a and will therefore not discussed. Once exposed in the manner shown in FIG. 3, battery tabs 114 can be electrically connected to BMU contacts 112 using any appropriate conductive adhesive such as solder. Once BMU contacts 112 and battery tabs 114 have been electrically connected together, first battery cell 102a can be flipped back to its original orientation. This process can then be repeated for third battery cell 102c as well as any other similarly configured battery cells included in battery assembly 100.

FIGS. 4-6 illustrate a particular manner of electrically connecting first battery cell 102a to BMU 104 in accordance with the described embodiments. For example, FIG. 4 shows pre-connection state 400 of battery cell 102a. Pre-connection state 400 can be typical of that found in shipping configuration 100. In pre-connection state 400, first battery cell 102a, battery tab 114, BMU 104, BMU contact 112 can all be located within battery profile 116. Battery profile 116 can define an amount of space required to install and assemble battery cell 102a into the tablet computing system. Therefore, by maintaining battery profile 116, space for other components can be preserved.

FIG. 5 shows flipped over state 500 in accordance with the described embodiments. Flipped over state 500 can allow battery tab 114 and BMU contact 112 to come close enough to each other to facilitate electrically connecting BMU tabs 112 and battery tab 114 using, for example, solder. Once BMU contacts 112 and battery tabs 114 are electrically connected to each other, first battery 102a can be flipped back to the original orientation as shown in FIG. 6 showing connection state 600. In connection state 600, first battery 102a is electrically connected to BMU 104 by way of battery tabs 114 and BMU contacts 112. It should be noted that due to the flexible nature of battery tabs 112, when going from flipped over state 500 to connection state 600, battery tabs 114 bend in such a way as to not exceed battery profile 116.

However, due to the presence of external circuit 118 (also shown in FIG. 2), battery tab 120 of second battery cell 102b can be pre-formed in a manner illustrated in FIG. 7 showing second battery cell 102b in pre-connection state 700. Pre-formed battery tab 120 can therefore allow battery 102b to accommodate external circuit 118 in flipped over state 800 shown in FIG. 8 and still provide for electrically connecting pre-formed battery tab 120 to BMU contact 112. In this way, pre-formed battery tab 120 of second battery cell 102b can be connected to BMU contact 112 as shown in second battery cell connected state 900 shown in FIG. 9. By pre-forming battery tab 120, second battery cell 102b can be aligned with and conform to the overall shape and size of battery assembly 102 as shown in FIG. 10 showing battery assembly 1000 formed of electrically connected battery cells 102 that fit with profile 116.

Once pre-assembly is complete, the remaining release liner can be removed and individual battery cells 102 in assembled state 1000 can each be directly attached to an interior surface of a rear portion of a housing of the tablet computing system using, for example, VHB type adhesive. In this way, there is no need for a separate battery support/protection structure along the lines of a battery case used in a conventional battery pack. By eliminating the battery case, the overall weight and z stack height of the power supply assembly is can be reduced over that required for the conventional battery pack.

As the battery cells 102 are attached directly to the housing, the cells 102 can be configured to conform to the shape of the inner wall of the housing which the battery cells 102 are directly attached. In this way, battery assembly 1000 can achieve a more efficient packing resulting in the tablet device consequently being made smaller. For example, the inner wall of the tablet device can have a curved surface. If battery cell 102 has a corresponding curved surface, the volume within the housing that is taken up by battery cell 102 can be minimized and the available volume for other components can therefore be maximized.

In some embodiments, the housing of the tablet computing device can be formed of aluminum. It will be appreciated that an aluminum housing can act as a heat sink to dissipate heat from the battery cells 102. According to the described embodiments, as the cells 102 are directly adhered to the housing of the tablet computing system and can conform to the shape of the housing. Therefore, the distance between battery cell 102 and the housing can be as little as the thickness of the adhesive used to adhere battery cell 102 to the housing. The close proximity of the cells 102 to the housing allows the housing to act as a heat sink to help dissipate the heat from the battery cells 102 to prevent overheating and damage of the cells 102 as well as other components of the device.

Figure 11:
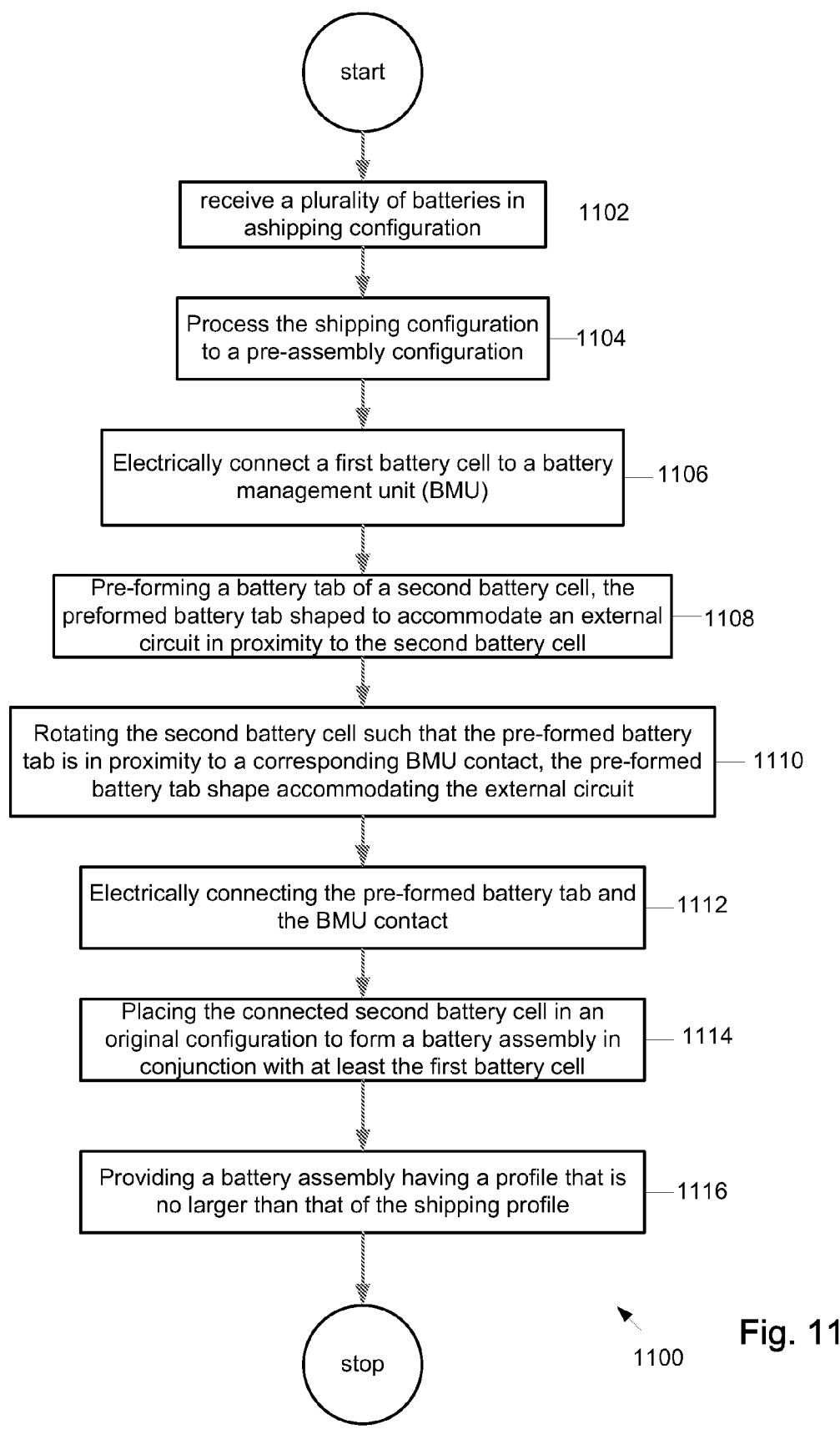
FIG. 11 is a flowchart detailing a process in accordance with the described embodiments.

FIG. 11 shows details of a flowchart describing process 1100 in accordance with the described embodiments. Process 1100 can be performed by first receiving a plurality of battery cells in a shipping configuration at 1102. The shipping configuration can include support layers that can take the form of release liners formed of plastic material that adhere to the plurality of battery cells. In this way, the release liners can provide both support and protection for the battery cells during transport as well as during storage prior to actually being needed. Once the plurality of battery cells has been received in the shipping configuration, at 1104, the shipping configuration of battery cells can be processed to form a pre-assembly configuration of battery cells. In one embodiment, the pre-assembly configuration of battery cells can be achieved by removing at least one of the release liners to expose the plurality of battery cells and a distributed battery management unit, or BMU.

At 1106, at least a first one of the plurality of battery cells is electrically connected to a corresponding BMU. In the described embodiment, the battery cell can include a battery tab and the BMU can include a corresponding BMU contact. In order to electrically connect the battery to the BMU, the battery tab is brought in close proximity to the BMU contact by flipping the battery cell over about 180 degrees. In this way, the battery tab and the BMU contact are close enough together for an electrical connection to be made between the two using, for example, solder. Moreover, all similarly configured battery cells in the pre-assembly configuration are likewise electrically connected to the correspond BMU.

Next at 1108, a battery tab corresponding to a second battery cell is pre-formed. The pre-formed battery cell tab has a shape that can accommodate an external circuit associated only with the second battery cell and any other similarly configured battery cells. The pre-forming can be performed by, for example, bending battery tab into a shape in accordance with the external circuit. Next, at 1110, the second battery cell is moved such that the pre-formed battery tab is placed in proximity to a corresponding BMU contact. The shape of the pre-formed battery tab accommodating the external circuit. Next at 1112, the pre-formed battery tab and the BMU contact are electrically connected to each other using, for example, solder. At 1114, the electrically connected second battery cell is moved back to the original orientation with respect to the other battery cells to form a battery assembly that fits within the battery profile of the shipping configuration at 1116

Figure 12:
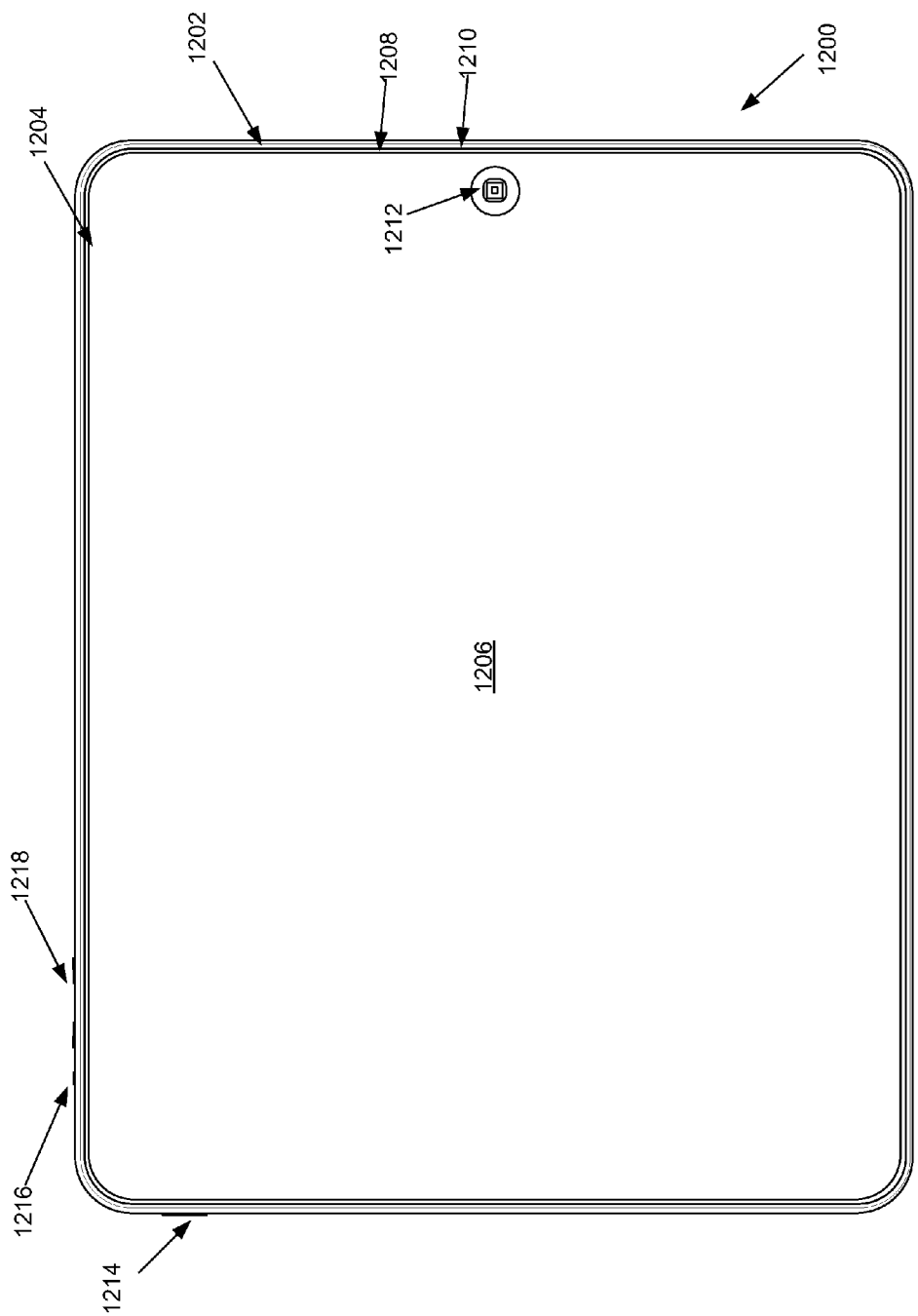
FIGS. 12-13 show a top view and side view of a tablet computing device in accordance with the described embodiments.

FIG. 12 illustrates a specific embodiment of portable computing device 100. More specifically, FIG. 12 shows a full top view of fully assembled portable computing device 1200. Portable computing device 1200 can process data and more particularly media data such as audio, video, images, etc. By way of example, portable computing device 1200 can generally correspond to a device that can perform as a music player, game player, video player, personal digital assistant (PDA), tablet computer and/or the like. With regards to being handheld, portable computing device 1200 can be held in one hand by a user while being operated by the user's other hand (i.e., no reference surface such as a desktop is needed). For example, the user can hold portable computing device 1200 in one hand and operate portable computing device 1200 with the other hand by, for example, operating a volume switch, a hold switch, or by providing inputs to a touch sensitive surface such as a display or pad.

Portable computing device 1200 can include single piece seamless housing 1202 that can be formed of any number of materials such as plastic or metal which can be forged, molded, or otherwise processed into a desired shape. In those cases where portable computing device 1200 has a metal housing and incorporates RF based functionality, it may be advantageous to provide at least a portion of housing 1202 in the form of radio (or RF) transparent materials such as ceramic, or plastic. In any case, housing 1202 can be configured to at least partially enclose any suitable number of internal components associated with the portable computing device 1200. For example, housing 1202 can enclose and support internally various structural and electrical components (including integrated circuit chips and other circuitry) to provide computing operations for portable computing device 1200. The integrated circuits can take the form of chips, chip sets, modules any of which can be surface mounted to a printed circuit board, or PCB, or other support structure. For example, a main logic board (MLB) can have integrated circuits mounted thereon that can include at least a microprocessor, semi-conductor (such as FLASH) memory, various support circuits and so on.

Housing 1202 can include opening 1204 for placing internal components and may be sized to accommodate a display assembly or system suitable for providing a user with at least visual content as for example via a display. In some cases, the display system can include touch sensitive capabilities providing the user with the ability to provide tactile inputs to portable computing device 1200 using touch inputs. The display system can be formed of a number of layers including a topmost layer taking the form of transparent protective layer 1206 formed of polycarbonate or other appropriate plastic or highly polished glass. Using highly polished glass, protective layer 1206 can take the form of cover glass 1206 substantially filling opening 1204. Seal 1208 can be used to form a gasket between cover glass 1206 and housing 1202. Seal 1208 can be formed of a resilient material such as a plastic along the lines of thermoplastic urethane or TPU. In this way, seal 1208 can provide protection against environmental contaminants from entering the interior of portable computing device 1200. Racetrack 1210 can be defined as the uppermost portion of the housing 1202 that surrounds cover glass layer 1206. In order to maintain the desired aesthetic look and feel of portable computing device 1200, it is desirable that any offsets between the housing 1202 and cover glass 1206 be minimized by centering racetrack 1210.

Although not shown, the display panel underlying cover glass 1206 can be used to display images using any suitable display technology, such as LCD, LED, OLED, electronic or e-inks, and so on. Display assembly may be placed and secured within the cavity using a variety of mechanisms. In one embodiment, the display system is snapped into the cavity. It may be placed flush with the adjacent portion of the housing. In this way, the display can present visual content that can include video, still images, as well as icons such as graphical user interface (GUI) that can provide information the user (e.g., text, objects, graphics) as well as receive user provided inputs. In some cases, displayed icons can be moved by a user to a more convenient location on the display. For example, GUI can be moved by the user manually dragging GUI from one location to a more convenient location. The display can also provide a user with tactile feedback provided by a number of haptic actuators usually, but not always, arranged in an array of haptic actuators incorporated into the display. In this way, the haptic actuators can provide the user with tactile feedback.

In some embodiments, a display mask (not shown) can be applied to, or incorporated within or under cover glass 1206. The display mask can be used to accent an unmasked portion of the display used to present visual content. The display mask can be used to make less obvious home button 1212 used to provide a specific input such as change display mode, for example to portable computing device 1200. The display mask can render home button 1212 less obvious by, for example, being closer in tone or color to home button 1212. For example, if home button 1212 is formed of a material that is somewhat darker (such as gray or black) than cover glass 1206, then using a similarly colored display mask can reduce the visual impact of home button 1212 when compared with the unmasked portion of cover glass 1206. In this way, the visual impact of home button 1212 can be reduced by being integrated into the overall look of the display mask. Furthermore, the display mask can provide a natural mechanism for directing the attention of a viewer to the unmasked area of the display used to present visual content.

Portable computing device 1200 can include a number of mechanical controls for controlling or otherwise modifying certain functions of portable computing device 1200. For example, power switch 1214 can be used to manually power on or power off portable computing device 1200. Mute button 1216 can be used to mute any audio output provided by portable computing device 1200 whereas volume switch 1218 can be used to increase/decrease volume of the audio output by portable computing device 1200. It should be noted that each of the above described input mechanisms are typically disposed through an opening in housing 1202 such that they can couple to internal components in some embodiments, portable computing device 1200 can include a camera module configured to provide still or video images. The placement may be widely varied and may include one or more locations including for example front and back of the device, i.e., one through the back housing, the other through the display window.

Portable computing device 1200 can include a mechanism for wireless communications, as either a transceiver type device or receiver only, such as a radio, portable computing device 1200 can include an antenna that can be disposed internal to a radio transparent portion of housing 1202. In some embodiments, an antenna can be incorporated into seal 1208 or cover glass 1206. In other embodiments, a portion of housing 1202 can be replaced with radio transparent material in the form of an antenna window described in more detail below. The radio transparent material can include, for example, plastic, ceramic, and so on. The wireless communications can be based on many different wireless protocols including for example 3G, 2G, Bluetooth, RF, 802.11, FM, AM, and so on. Any number of antennae may be used, which can use a single window or multiple windows depending on the needs of the system. In one embodiment, the system can include at least first and second antenna windows built into the housing.

Figure 13:
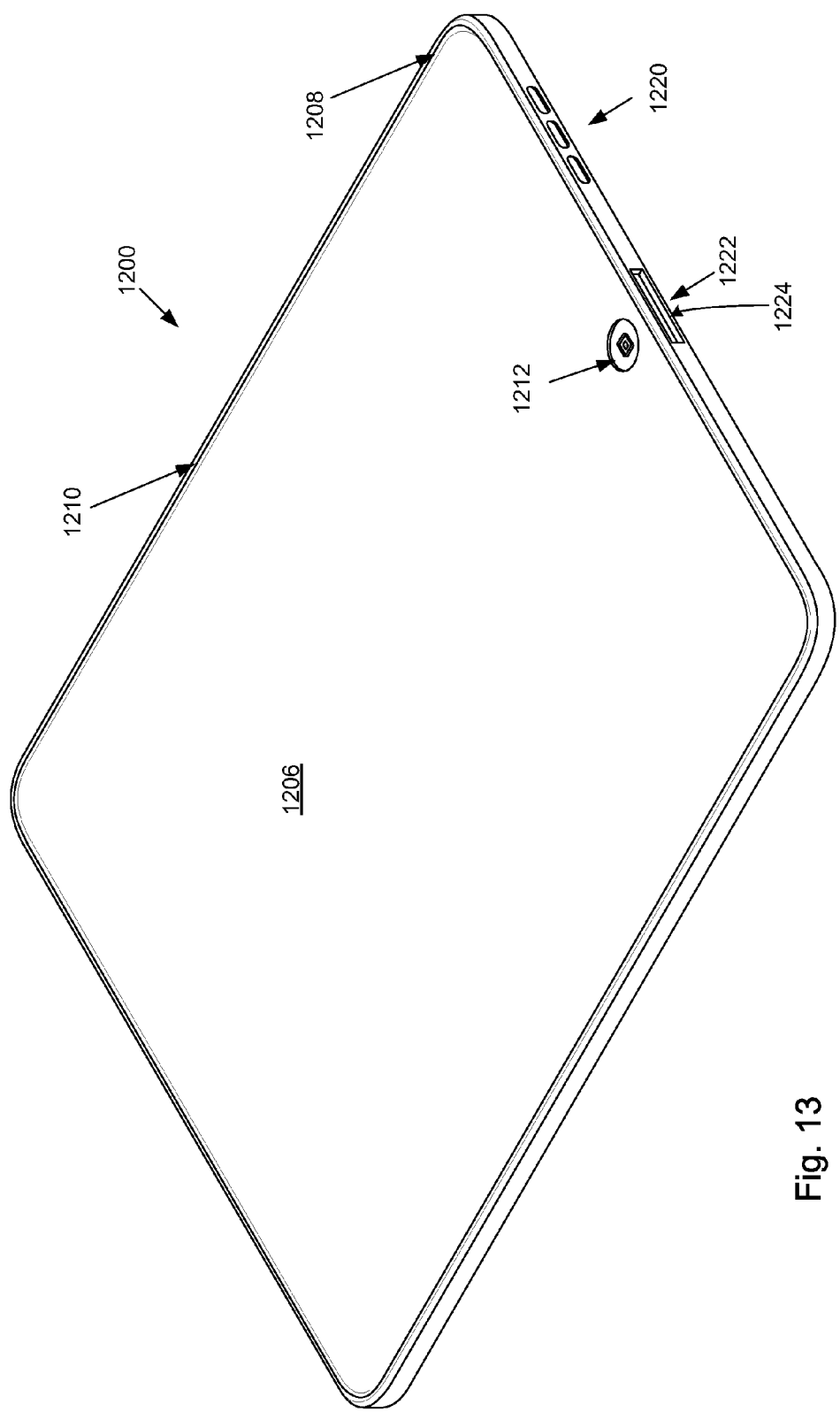

FIG. 13 shows a perspective top view of portable computing device 1200 in accordance with the described embodiments. As shown in FIG. 13, portable computing device 1200 can include one or more speakers 1220 used to output audible sound. Portable computing device 1200 can also include one or more connectors for transferring data and/or power to and from portable computing device 1200. For example, portable computing device 1200 can include multiple data ports, one for each configuration of portrait mode and landscape mode. However, the currently described embodiment includes single data port 1222 that can be formed of connector assembly 1224 accommodated within an opening formed along a first side of housing 1202. In this way, portable computing device 1200 can use data port 1222 to communicate with external devices when portable computing device 1200 is mounted in docking station. It should be noted that in some cases, portable computing device 1200 can include an orientation sensor or an accelerometer that can sense the orientation or movement of portable computing device 1200. The sensor can then provide an appropriate signal which will then cause portable computing device 1200 to present visual content in an appropriate orientation.

Connector assembly 1224 can be any size deemed appropriate such as, for example, a 30 pin connector. In some cases, the connector assembly 1224 can serve as both a data and power port thus obviating the need for a separate power connector. Connector assembly 1224 can be widely varied. In one embodiment, connector assembly 1224 can take the form of a peripheral bus connector, such as a USB or FIREWIRE connector. These types of connectors include both power and data functionality, thereby allowing both power delivery and data communications to occur between the portable computing device 1200 and the host device when the portable computing device 1200 is connected to the host device. In some cases, the host device can provide power to the media portable computing device 1200 that can be used to operate the portable computing device 1200 and/or charge a battery included therein concurrently with the operating.

The advantages of the embodiments described are numerous. Different aspects, embodiments or implementations may yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents may be resorted to as falling within the scope of the invention.

What is claimed is:

1. A method, comprising:
    receiving a plurality of battery cells in a shipping configuration, each of the plurality of battery cells being electrically unconnected, the unconnected battery cells fitting within a battery profile;
    processing the shipping configuration to form a pre-assembly configuration of the plurality of battery cells;
    electrically connecting at least a first one of the plurality of battery cells to a corresponding distributed battery management unit (dBMU);
    pre-forming a battery contact associated with a second battery cell, the second battery cell associated with an external circuit package associated with the dBMU, the preformed battery tab having a shape in accordance with the external circuit package;
    moving the second battery cell such that the pre-formed battery tab is in proximity to a dBMU contact;
    electrically connecting the pre-formed battery tab to the dBMU contact;
    returning the second battery cell to the original orientation, and
    providing a battery assembly suitable for installation in a small form factor computing device, the battery assembly fitting within the battery profile.

2. The method as recited in claim 1, wherein the small form factor computing device is a tablet computing device.

3. The method as recited in claim 1, wherein the shipping configuration comprises:
    a first protective layer;
    a second protective layer, wherein the plurality of battery cells and the dBMU are disposed between the first protective layer and the second protective layer.

4. The method as recited in claim 3, wherein the processing the shipping configuration comprises:
    removing at least one of the protective layers to expose the plurality of battery cells.

5. The method as recited in claim 1, wherein the battery cells are jelly roll type battery cells.

6. A battery assembly, comprising:
    a plurality of battery cells, each battery cell comprising:
    an electrode assembly including an anode and a cathode, and an electrolyte, and
    a containment structure for enclosing the electrode and the electrolyte, the containment structure configured to prevent leakage of the electrolyte or gasses generated during operation of the battery assembly,
    wherein the plurality of battery cells includes at least a first and a second battery cell each connected to a distributed battery monitoring unit (dBMU), the second battery cell being associated with an external circuit, the second battery cell connected to the distributed battery management unit (dBMU) by way of a pre-formed battery contact shaped to accommodate the external circuit, and
    wherein the plurality of battery cells are electrically connected to at least the dBMU such that each of the plurality of battery cells are substantially aligned with each other thereby preserving a battery profile corresponding the unconnected battery cells.

7. The battery assembly as recited in claim 6, further comprising:
    wherein the first one of the plurality of battery cells is connected to the dBMU by moving the first battery cell over to expose a first battery cell tab and electrically connecting the first battery cell tab to a first contact of the distributed dBMU.

8. The battery assembly as recited in claim 7, further comprising:
    wherein the second one of the plurality of battery cells is connected to the dBMU by fixturing the second battery cell, pre-forming the second battery cell tab in order to accommodate the external circuit such that after the second battery cell tab is electrically connected to the corresponding dBMU contact and is subsequently oriented in a final configuration, each of the plurality of battery cells are substantially aligned with each other.

9. The battery assembly as recited in claim 6, wherein each of the plurality of battery cells are electrically connected to the dBMU by welding.

10. The battery assembly as recited in claim 6, wherein each of the plurality of battery cells are electrically connected to the dBMU by soldering.

11. A small form factor computing device, comprising:
    a housing; and
    a battery assembly, the battery assembly comprising:
    a plurality of battery cells, and
    a distributed battery management unit (dBMU), wherein the plurality of battery cells includes at least a first and a second battery cell each connected to the distributed battery monitoring unit (dBMU), the second battery cell being associated with an external circuit connected to the dBMU, the second battery cell connected to the distributed battery management unit (dBMU) by way of a pre-formed battery contact shaped to accommodate the external circuit, and wherein the plurality of battery cells are electrically connected to at least the dBMU such that each of the plurality of battery cells are substantially aligned with each other thereby preserving a battery profile corresponding the unconnected battery cells, wherein the battery assembly is attached directly to an interior portion of the housing.

12. The small form factor computing device as recited in claim 11, wherein the first one of the plurality of battery cells is connected to the dBMU by moving the first battery cell over to expose a first battery cell tab and electrically connecting the first battery cell tab to a first contact of the distributed dBMU.

13. The small form factor computing device as recited in claim 11, wherein the small form factor computing device is a tablet computing device.

14. The small form factor computing device as recited in claim 11, wherein the second one of the plurality of battery cells is connected to the dBMU by fixturing the second battery cell, pre-forming the second battery cell tab in order to accommodate the external circuit such that after the second battery cell tab is electrically connected to the corresponding dBMU contact and is subsequently oriented in a final configuration, each of the plurality of battery cells are substantially aligned with each other.

15. The small form factor computing device as recited in claim 11, wherein the battery assembly is attached to the interior of the housing an adhesive.

16. A method of assembling a tablet computing device, comprising:
receiving a tablet computing device housing; and
receiving a plurality of batteries and a distributed battery management unit (dBMU) from a battery vendor in a shipping configuration sized to fit within a shipping configuration profile;
processing the plurality of unconnected plurality of batteries to form a battery assembly, the battery assembly comprising a plurality of connected batteries each being connected to the dBMU, the battery assembly having a size that fits within the shipping configuration profile;
using an adhesive to attach the battery assembly directly to an interior portion of the housing; and
electrically connecting a plurality of operational components to the battery assembly prior to sealing the housing.

17. The method as recited in claim 16, wherein the first one of the plurality of battery cells is connected to the dBMU by moving the first battery cell over to expose a first battery cell tab and electrically connecting the first battery cell tab to a first contact of the distributed dBMU.

18. The method as recited in claim 16, wherein the small form factor computing device is a tablet computing device.

19. The method as recited in claim 16, wherein the second one of the plurality of battery cells is connected to the dBMU by fixturing the second battery cell, pre-forming the second battery cell tab in order to accommodate the external circuit such that after the second battery cell tab is electrically connected to the corresponding dBMU contact and is subsequently oriented in a final configuration, each of the plurality of battery cells are substantially aligned with each other.

20. The method as recited in claim 16, wherein each of the plurality of battery cells are electrically connected to the dBMU by soldering.

21. The method as recited in claim 16, wherein the battery assembly comprises:
a plurality of battery cells, and
a distributed battery management unit (dBMU), wherein the plurality of battery cells includes at least a first and a second battery cell each connected to the distributed battery monitoring unit (dBMU), the second battery cell being associated with an external circuit connected to the dBMU.

22. The method as recited in claim 21, wherein the second battery cell is connected to the distributed battery management unit (dBMU) by way of a pre-formed battery contact shaped to accommodate the external circuit, and wherein the plurality of battery cells are electrically connected to at least the dBMU such that each of the plurality of battery cells are substantially aligned with each other thereby preserving a battery profile corresponding the unconnected battery cells, wherein the battery assembly is attached directly to an interior portion of the housing.

23. The method as recited in claim 16, wherein the processing the shipping configuration to form the battery assembly comprises:
processing the shipping configuration to form a pre-assembly configuration of the plurality of battery cells;
electrically connecting at least a first one of the plurality of battery cells to a corresponding distributed battery management unit (dBMU);
pre-forming a battery contact associated with a second battery cell, the second battery cell associated with an external circuit package associated with the dBMU, the preformed battery tab having a shape in accordance with the external circuit package;
moving the second battery cell such that the pre-formed battery tab is in proximity to a dBMU contact; and
electrically connecting the pre-formed battery tab to the dBMU contact;
returning the second battery cell to the original orientation.

* * * * *